United States Patent [19]

Shreve

[11] 4,359,140
[45] Nov. 16, 1982

[54] ENGINE AUXILIARY OILER

[76] Inventor: James S. Shreve, 10027 Black Court, Fairfax, Va. 22032

[21] Appl. No.: 166,005

[22] Filed: Jul. 7, 1980

[51] Int. Cl.³ .......................... F01M 1/00; F01M 7/00
[52] U.S. Cl. ................................. 184/6.3; 123/196 S; 184/6.4
[58] Field of Search ................................. 184/6.3, 6.4; 123/196 S

[56] References Cited

U.S. PATENT DOCUMENTS

| | | | |
|---|---|---|---|
| 2,747,564 | 5/1956 | Wehling | 184/6.3 X |
| 2,755,787 | 7/1956 | Butler et al. | 184/6.3 X |
| 2,838,039 | 6/1958 | Smith et al. | 184/6.3 X |
| 2,867,203 | 1/1959 | Easton et al. | 184/6.3 X |
| 3,556,070 | 12/1971 | Holcomb | 184/6.3 X |
| 3,722,623 | 3/1973 | Waldecker | 184/6.3 |
| 4,061,204 | 12/1977 | Kavtz | 184/6.3 |
| 4,094,293 | 6/1978 | Evans | 184/6.3 X |
| 4,157,744 | 6/1979 | Capriotti | 184/6.3 |
| 4,168,693 | 9/1979 | Harrison | 123/196 S |
| 4,199,950 | 4/1980 | Hakanson et al. | 184/6.3 X |

Primary Examiner—David H. Brown
Attorney, Agent, or Firm—Nathan Edelberg; Robert P. Gibson; Saul Elbaum

[57] ABSTRACT

An auxiliary lubrication means is disclosed which is suitable for use in conjunction with an internal combustion engine or similar mechanical device. The present apparatus includes a reservoir for storing a lubricant under pressure during normal operation of the engine. Upon failure of the engine's lubrication system, or during a subsequent start-up procedure, the means of the present invention is operative to provide lubricant to the moving parts of the engine.

7 Claims, 9 Drawing Figures

TOWARD FILTER    TOWARD ENGINE

ENGINE AUXILIARY OILER

RIGHTS OF THE GOVERNMENT

The invention described herein may be manufactured, used, and licensed by or for the United States Government for governmental purposes without payment to me of any royalty thereon.

BACKGROUND OF THE INVENTION

Internal combustion engines, and other machines which comprise internal lubrication systems, retain little lubricating oil on the bearing surfaces when sitting idle for an extended period. Upon start-up, the engine or machine will run for several seconds without proper lubrication, thereby experiencing undue wear. The prior art does not offer any simple and inexpensive means to provide internal lubrication to an engine or similar machine when the machine is not running or when the machine's own lubrication system fails.

While engine wear has always been recognized as a problem, recent drastic increases in the cost of new machinery has made resolution of the problem all the more urgent. It is therefore an object of this invention to provide means to reduce unnecessary wear in internal combustion engines and other such devices by providing lubrication means which supplements the primary lubrication system of the engine or other apparatus.

It is an object of the invention to provide means which will provide lubrication under pressure to the wearing parts of an engine when the primary lubrication system of the engine is not operational.

It is another object of this invention to provide lubricating oil under pressure to the bearing surfaces of an internal combustion engine upon start-up of the engine, before the conventional oiling system has developed adequate pressure.

It is an object of this invention to provide lubrication to the bearing surfaces of an engine whenever the conventional lubrication system fails to develop adequate pressure during normal operation of the engine.

It is an object of this invention to provide means which will perform the above mentioned functions which can be easily retrofit to a standard internal combustion engine without any modifications whatsoever being made to the engine.

It is still another object of the invention to provide such auxiliary lubrication means which is inexpensive to manufacture, simple in its structure, and highly reliable, having no parts likely to malfunction.

It is yet another object of the invention to provide auxiliary lubrication means which will not interfere with other functions of the engine in any manner whatsoever.

SUMMARY OF THE INVENTION

The above objects are met by the provision of a reservoir which accumulates and stores oil under pressure during normal operation of the associated engine. Means are provided to divert a portion of the oil coursing through the engine to the reservoir. This means may conveniently comprise an adaptor plate interposed between the engine and the oil filter normally associated therewith. Automatic release means in the form of an electrically operated valve is associated with the reservoir to effect discharge of the lubricant from the reservoir at selected times.

The auxiliary lubrication system of the present invention is capable of providing lubrication under pressure to an internal combustion engine or a similar device without the use of pumps or other complex mechanical elements. The apparatus of the present invention is therefor extremely reliable and inexpensive to manufacture. Additionally, the disclosed embodiment is capable of being retrofit to an engine without any modifications to the engine whatsoever, and without the use of specialized tools or mechanical skills.

DESCRIPTION OF A PREFERRED EMBODIMENT

Figure 1:
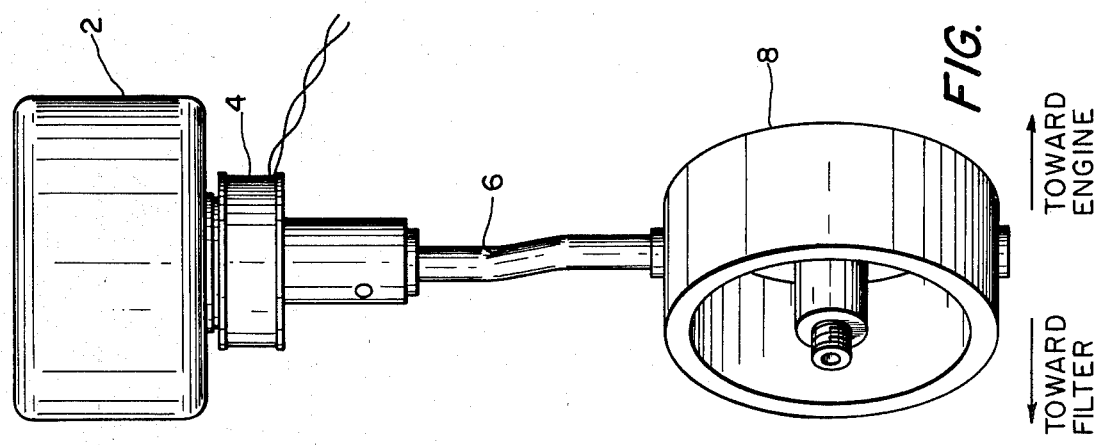
FIG. 1 is an overall view of the apparatus comprising the auxiliary lubrication means of the present invention.

FIG. 1 illustrates generally the elements which comprise the apparatus of the present invention. The auxiliary lubrication system comprises a reservoir 2 for storing lubricant under pressure. Associated with the reservoir is a solenoid operated valve 4 which operates to allow discharge of the lubricant from the reservoir at selected times, as will be more fully discussed below. Conduit 6 connects the reservoir to an adaptor means 8 which provides for passage of lubricant between the reservoir and the primary lubrication system of the engine. The adaptor means 8 is designed to be interposed between the engine and the oil filter provided for the primary lubrication system.

Figure 1A:
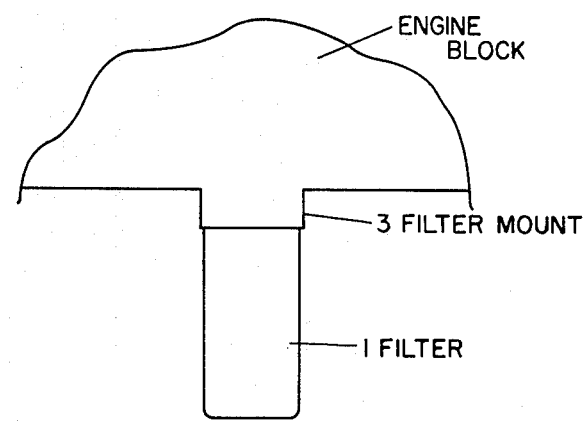
FIG. 1A shows a section of an existing engine block with means for mounting a filter and a filter.
Figure 1B:
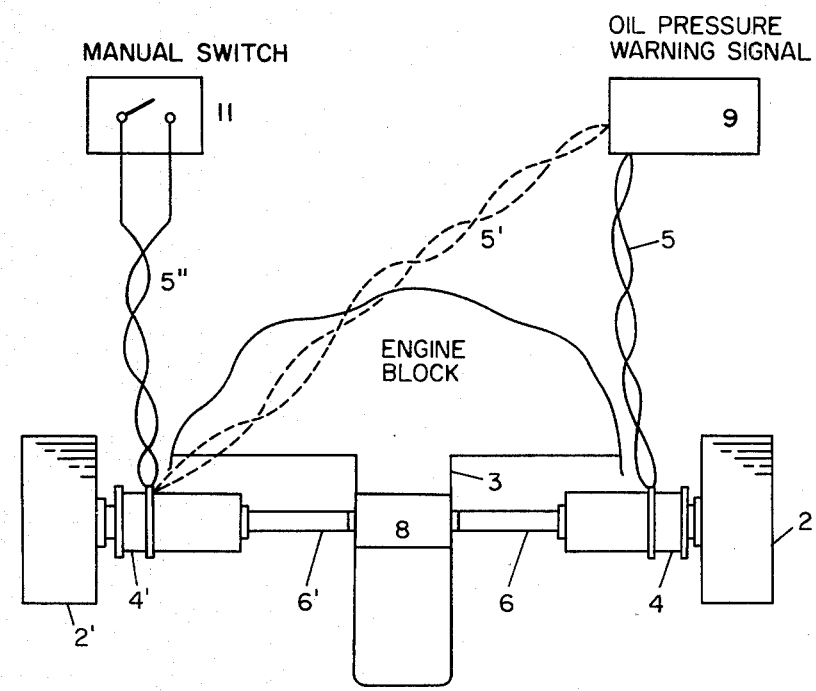
FIG. 1B shows the section of an existing engine block shown in FIG. 1A with the device of the present invention installed.

FIG. 1A shows a section of an existing engine block, means for mounting a filter 3 and an attached filter 1. FIG. 1B shows the device of the present invention installed on the section of the engine block shown in FIG. 1A. As can be appreciated, the device is installed by first removing the filter 1 from the engine block, installing adaptor means 8 and then installing filter 1 onto adaptor means 8. Also shown is a first auxiliary lubrication reservoir 2, solenoid 4 and conduit 6 with electrical leads 5 connected to the oil pressure warning signal 9 located on the dashboard of the vehicle. A second auxiliary lubrication reservoir 2', solenoid 4' and conduit 6' is shown attached to adaptor means 8. It is to be understood that the installation of the second auxiliary lubrication system is optional as will be explained in more detail below. Two alternate means for releasing the lubricant from the second reservoir are indicated. Shown in solid lines are leads 5" attached to a manually operated switch located on the dashboard of the vehicle for activation by the operator. Shown in dashed lines are leads 5' attached to the oil pressure warning signal 9 for activation at the same time the first auxiliary lubrication reservoir 2 is activated.

Figure 2B:
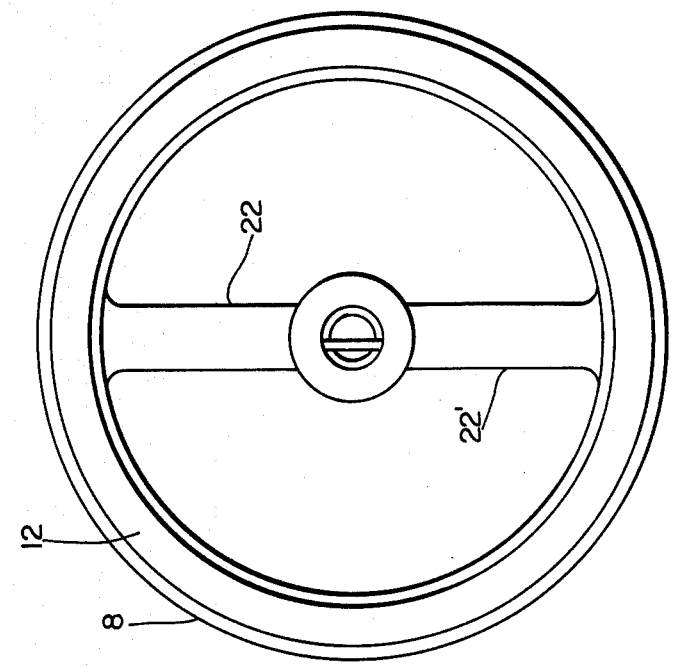
FIG. 2B is an end view of the adaptor means of FIG. 2A.
Figure 2A:
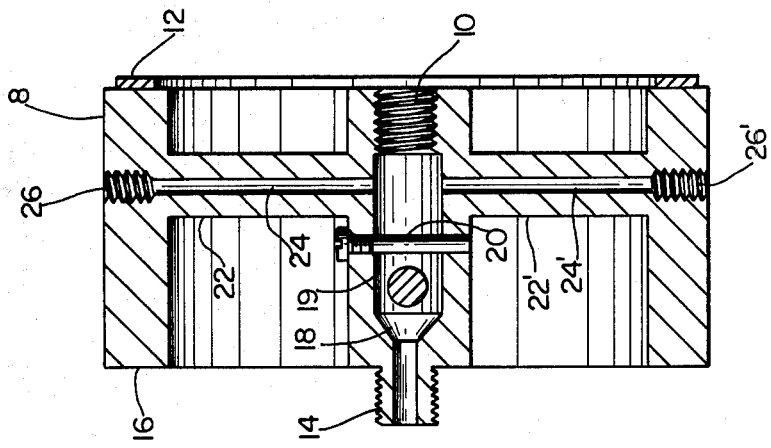
FIG. 2A is a cross sectional view of an adaptor means of the present invention which provides for passage of lubricant between the engine and the reservoir of the auxiliary lubrication means.

FIGS. 2A and 2B illustrate in greater detail the configuration of the adaptor means. Referring to FIG. 2A, reference numeral 10 indicates internal threads which are designed to mate with the threads on the engine which normally secure the oil filter thereto. Upon engagement of the adaptor with the engine, gasket 12 provides a sealing engagement between the engine block and the adaptor. After securing the adaptor to the engine, the engine oil filter may be secured to threaded portion 14 of the adaptor, the gasket associated with the oil filter forming a sealing interface with surface 16.

Central passage 19 of the adaptor comprises ball valve 18. Transverse pin 20 is provided to retain the ball in proper position within the passage. Radial spokes 22, 22' support the central passage portion of the adaptor, and comprise conduits 24, 24', respectively. In the embodiment illustrated in FIG. 1, the conduit 6 is secured to the adaptor at threaded opening 26, while opening 26' is closed by means of a threaded plug. The opening 26' may be utilized for the purpose of attaching a secondary reservoir, as will be more fully discussed below. During normal operation of the engine, oil will pass around spokes 22, 22' into the filter while passing out of the filter through central passage 19, returning to the engine block in the flow pattern normally associated with the engine and filter.

Figure 3:
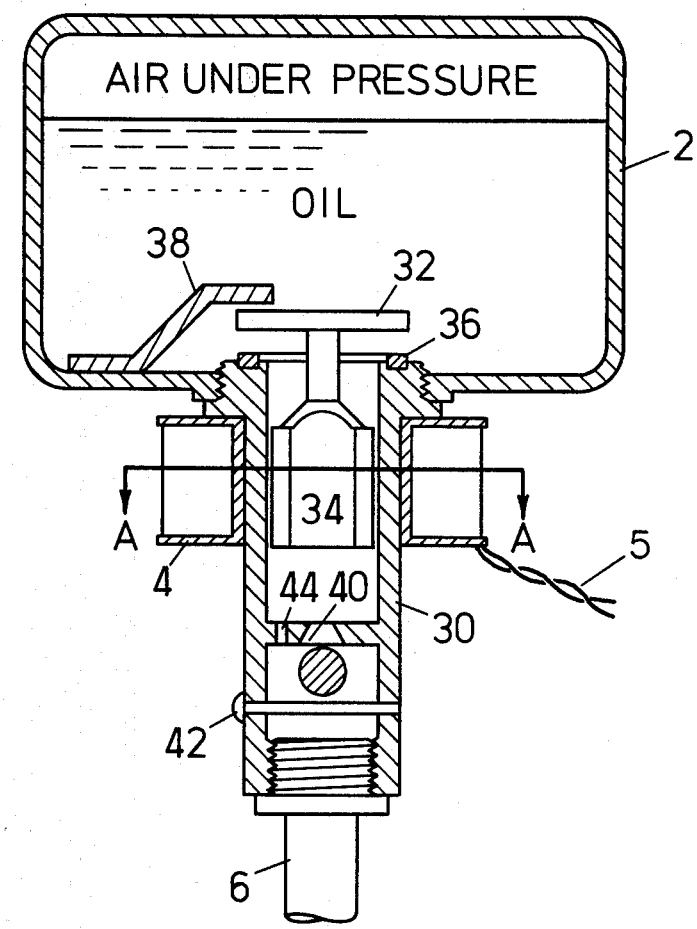
FIG. 3 is a detailed sectional view of the reservoir and associated valve means of the apparatus of the present invention.

FIG. 3 illustrates in greater detail the reservoir and associated valve means of the present invention. This portion of the apparatus is designed so that it may be mounted in any convenient location near the engine, and is in fluid communication with the adaptor by means of conduit 6.

The valve, generally designated at 30, comprises plunger 32, 34 freely movable in a vertical direction. In its closed position, plunger portion 32 sealingly engages O-ring 36. Stop means 38 acts to retain the plunger within the valve body. Solenoid 4 is positioned around the body 30 of the valve and when actuated will force the plunger 32, 34 to move upwardly into an open position. Ball valve 40 and metering orifice 44 is provided beneath the plunger. Retaining pin 42 retains the ball in its proper position.

Figure 4:
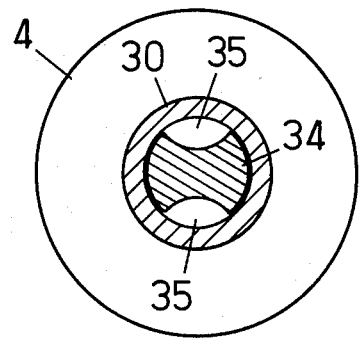
FIG. 4 is a sectional view along line A—A of FIG. 3, showing the cross sectional configuration of the plunger associated with the valve means.

FIG. 4 is a cross sectional view of the plunger 34, taken along line A—A of FIG. 3. As is evident, plunger portion 34 is configured so as to provide passages 35 for the free flow of lubricant to and from the reservoir 2.

Installation and operation of the auxiliary lubrication means of the present invention will be described with particular reference to FIGS. 1A through 3. The adaptor is installed between the engine and oil filter as previously described, while the reservoir is mounted at any convenient location nearby. Conduit 6 maintains the adaptor and reservoir in fluid communication with one another. Solenoid 4 is electrically connected to the oil pressure warning signal of the vehicle by means of leads 5.

During normal running of the engine, the solenoid 4 receives no electrical energy, thereby permitting the plunger 32, 34 to move freely within the valve. The plunger will normally rest against the O-ring 36 but will nevertheless be freely movable. As the engine continues to run, the pressure within the reservoir will reach equalibrium with the internal lubrication pressure of the engine. Lubricant will therefore pass from the engine through passage 24 of the adaptor, through conduit 6 to the valve means 30. Oil will pass at a controlled rate through the metering orifice 44, through passages 35 past the plunger and into the reservoir 2. Ball valve 40 acts to limit the rate of flow of lubricant into the reservoir, thereby preventing a surge of lubricant from entering the reservoir upon start-up of the engine. Such surge would rob the engine of critical lubrication. The reservoir is thereby substantially filled with oil at a pressure which is in equilibrium with the internal oil pressure of the engine. Perhaps a pint of oil is stored in this manner.

When the engine is shut down, the pressure within the engine drops. The relatively high pressure in the reservoir will retain the plunger in a closed position, thereby trapping the oil within the reservoir under pressure. Upon a subsequent start-up, as the ignition switch is turned on (but before the starter is activated) the oil pressure warning signal is activated, thereby providing power to the solenoid 4 by means of leads 5. This forces open the plunger of the valve, permitting the pressurized reservoir to discharge the oil through conduit 6 to the adaptor 8. The oil flows through conduits 24 and 19 of the adaptor into the engine oil passageways. Ball valve 18 prevents the oil from flowing back into the oil filter, thereby assuring that the flow from the reservoir reaches the oil passageways of the engine and the moving parts needing lubrication.

After a brief interval, the oil has reached all bearing surfaces, and the engine starter may then be safely activated. After start-up, the solenoid is again deactivated, and oil may be forced from the engine back into the reservoir as previously described. If the primary lubrication system of the engine should fail during the time that the engine is running, the oil pressure warning signal will be activated. This will energize the solenoid 4, thereby maintaining the plunger 32, 34 in an open position. This will permit oil from the reservoir to flow back into the engine in the manner previously described. In this way, the engine will be provided with adequate lubrication even after the failure of the primary lubrication system of the engine. The operator may then shut down the engine before it has any opportunity to run without adequate lubrication on its moving parts.

As previously noted, the adaptor 8 comprises a second opening 26' which is closed by a threaded plug when the inventive apparatus comprises a single reservoir, as shown in FIG. 1. It is within the scope of the present invention that a second reservoir be provided for the auxiliary lubrication system, such second reservoir being connected to the adaptor by means of threaded opening 26', as shown in FIG. 1B.

In a first alternative embodiment, the second reservoir may be substantially identical to that shown in FIG. 3, having its solenoid electrically in contact with the oil pressure warning light of the vehicle. When the solenoid of the secondary reservoir is connected in this manner, the secondary reservoir will discharge simultaneously with the first reservoir of the system, in the manner previously described. In this way, the secondary reservoir will act to supplement the oil storage capacity of the first reservoir, providing a greater quantity of lubrication to the engine upon discharge of lubricant.

A second alternative embodiment of the present invention comprises a secondary reservoir and solenoid operated valve substantially as previously described, and connected to the adaptor at opening 26'. However, in this embodiment the solenoid 4 is not in electrical contact with the oil pressure warning indicator. Rather, a manually operated electrical switch 11 is provided in contact with leads 5 enabling the operator to release at will the oil stored in the secondary reservoir. If the engine is started in the normal sequence, as set forth above, the oil from the primary reservoir will be discharged into the engine providing lubrication for the initial start-up. If the engine should stall shortly thereafter, there will not be sufficient time for the first reservoir to accumulate a sufficient supply of oil therein. If the engine should then remain idle for a period sufficient for the lubrication to drain from the bearing surfaces, the first reservoir will be unable to provide sufficient lubrication for starting the engine. At this time the operator may manually release the lubrication stored in the secondary reservoir, thereby providing adequate lubrication for start-up of the engine.

Also, in some instances it is necessary to operate the starter, or "crank" the engine for an extended period of time in order to initiate running of the engine. In such instances, the lubrication initially provided by the first reservoir might be dissipated or drained from the bearing surfaces. The operator could then manually release the lubricant from the secondary reservoir in order to lubricate the moving parts of the engine throughout the entire starting procedure.

Figure 5A:
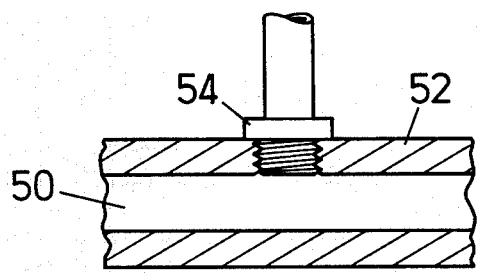
FIGS. 5A and 5B illustrate an alternate embodiment of an adaptor means of the present invention.
Figure 5B:
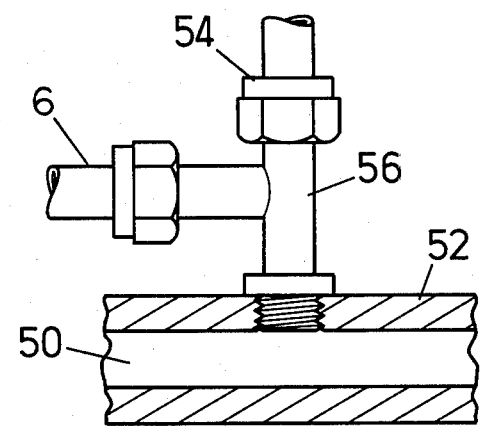

FIGS. 5A and 5B illustrate an alternate form of the adaptor means of the present invention. Engine block 52 will normally comprise a series of oil passages 50. Oil pressure sensor 54 is in fluid communication with at least one of the oil passages in order to sense the internal lubricant pressure. As illustrated in FIG. 5B, in order to provide for passage of lubricant to and from the reservoir of the present invention, a T-fitting 56 is secured to the engine block in place of the sensor 54. The sensor is then coupled to another fitting of the T, while conduit 6 of the auxiliary lubrication system of the present invention is secured to the remaining branch of the fitting.

In order to provide for passage of lubricant to and from a second reservoir, as described above, it is possible to provide additional outlets or branches for the fitting 56. Also, it is possible to connect the conduit 6 of the auxiliary lubrication means to the engine block at any access point. The oil pressure sensor port, being provided in most internal combustion engines, is a very convenient point of access to the internal lubrication system of the engine.

The present invention provides a very simple, inexpensive, yet reliable means for providing auxiliary lubrication to an internal combustion engine upon start-up of the engine or upon failure of the primary lubrication system thereof. The apparatus of the present invention may readily be installed on an existing engine without the use of specialized tools or mechanical skills. The present invention thereby provides an inexpensive way in which one may significantly reduce the wear and tear on an internal combustion engine without resorting to drastic modifications of the engine. Thus, engine life is significantly extended.

Although the device of the present invention has been described as being used in conjunction with an internal combustion engine, it is to be understood that it is not limited to such use. Apparatus in accordance with the present invention may be readily used in conjunction with any mechanical apparatus which comprises a lubrication system which operates under pressure.

Therefore, I do not wish to be limited to the particular details disclosed and described with relation to the accompanying drawings, as obvious modifications will be apparent to those of ordinary skill in the art.

I claim:

1. A device, interposed within the primary lubrication system of an internal combustion engine for providing lubricant under pressure to the engine during pre-start or failure of the primary lubrication system; the primary lubrication system including a lubricant under pressure during operation of the engine, a lubricant filter and means for mounting the filter on the engine; comprising:
   an adaption plate interposed between said filter and said means for mounting said filter;
   a first reservoir for storing a lubricant under pressure and maintaining said lubricant under pressure;
   directing means within said adaptor plate, for diverting a first portion of said lubricant flowing through said primary lubrication system;
   first fluid communication means for communicating said first portion of said lubricant from said diverting means to said first reservoir;
   first releasing means for releasing said lubricant stored in said first reservoir into said primary lubrication system through said first fluid communication means; and
   first control means for controlling said releasing means.

2. A device, as recited in claim 1, wherein said adaptor plate comprises:
   a first portion adapted to be operatively connected to said means for mounting said filter to said engine; and
   a second portion adapted for mounting said filter.

3. A device, as recited in claim 2, wherein said first control means comprises:
   means for sensing a signal indicating that said primary lubrication system is inoperative; and
   means for communicating said signal to said first releasing means.

4. A device, as recited in claim 3, wherein said signal is generated in an oil pressure warning light circuit.

5. A device, as recited in claim 4; wherein said directing means diverts a second portion of said lubricant; and wherein said device further comprises:
   a second reservoir;
   second fluid communication means for communicating said second portion of said lubricant from said diverting means to said second reservoir;
   second releasing means for releasing said lubricant stored in said second reservoir into said primary lubrication system through said second fluid communication means; and
   second control means for controlling said second releasing means.

6. A device, as recited in claim 5, wherein said second control means comprises:
   means for communicating said signal indicating that said primary lubrication system is inoperative to said second releasing means.

7. A device, as recited in claim 5, wherein said second control means comprises:
   a manually operated switch for producing an operator generated signal
   means for communicating said operator generated signal to said second releasing means.

* * * * *